(12) United States Patent  
Cahill et al.

(10) Patent No.: US 8,379,247 B2
(45) Date of Patent: Feb. 19, 2013

(54) METHOD, SYSTEM AND TEST SHEET IMAGE BITMAP FOR CARRYING OUT A SCANNER-AND-PROCESSOR BASED IMAGE-TO-PAPER REGISTRATION SETUP

(75) Inventors: Adam Daniel Cahill, Louisville, KY (US); Franklin Joseph Palumbo, Nicholasville, KY (US); Cary Patterson Ravitz, Lexington, KY (US); David Anthony Schneider, Lexington, KY (US); Daniel Paul Cahill, Verona, KY (US); Mark Andrew Omelchenko, Lexington, KY (US); Philip David Jones, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 1118 days.

(21) Appl. No.: 12/200,618

(22) Filed: Aug. 28, 2008

(65) Prior Publication Data

US 2010/0053699 A1 Mar. 4, 2010

(51) Int. Cl.
*G06F 15/00* (2006.01)
*B44C 1/26* (2006.01)

(52) U.S. Cl. ..................................... 358/1.15; 428/64.1
(58) Field of Classification Search ................. 358/1.15
See application file for complete search history.

(56) References Cited

U.S. PATENT DOCUMENTS 5,773,116 A * 6/1998 Lamartine et al. ........... 428/64.1
6,763,199 B2 * 7/2004 Conrow et al. ................. 399/15

* cited by examiner

*Primary Examiner* — Saeid Ebrahimi Dehkordy

(57) ABSTRACT

A method and system for carrying out an image-to-paper printer registration setup includes: using a printer undergoing registration setup, printing a test pattern on a sheet having reference targets within a printable region of the sheet; using a scanner, scanning the printed sheet to generate an image bitmap of the test pattern-bearing sheet larger than the sheet itself so that the image bitmap contains the sheet edges and measuring in numbers of pixels the distances between the reference targets and/or sheet edges using multiple swaths of the image bitmap itself as the measuring tool; and, using a processor and based on the measured distances, calculating error-associated adjustment values in millimeters to use to correct errors in the registration setup of the image-to-paper in the printer and transferring the error-associated adjustment values to the printer to perform adjustment of its setup actuators.

20 Claims, 6 Drawing Sheets

METHOD, SYSTEM AND TEST SHEET IMAGE BITMAP FOR CARRYING OUT A SCANNER-AND-PROCESSOR BASED IMAGE-TO-PAPER REGISTRATION SETUP

BACKGROUND

1. Field of the Invention

The present invention relates generally to image-to-paper registration setup of a printer and, more particularly, to a method, system and test sheet image bitmap for carrying out a scanner-and-processor based image-to-paper registration setup of a printer.

2. Description of the Related Art

With respect to most prior art printers, detection of image-to-paper registration errors is performed manually by the user. A registration test pattern is printed on an output sheet and the user visually examines the registration test pattern to determine the amount of any registration errors. After determining the amount of any registration errors, the user enters adjustment data into the printer via an operator panel. Adjustment of registration errors by manual inspection of registration marks and manual entry of adjustment data into the printer are inconvenient for user. Each adjustment step may involve multiple iterations of printing and measuring test images and adjusting imaging system parameters before registration error magnitudes are reduced to acceptable levels.

In the case of one current prior art printer, image-to-paper registration is set-up using a printed test pattern having registration marks which are referenced to the four edges of the sheet. However, in many cases, it is not always possible to print all the way to the edges of the page. Hence, in these cases, the reference marks may not always be visible, making it difficult to register the printer. The current prior art registration procedure is accomplished using iterative adjustment, significantly increasing the time necessary to register the printer, to be within the acceptable limits. Given that the registration marks are referenced to each edge of the sheet, the tolerance on the width of the sheet itself adds an additional variability to the accuracy of the adjustments.

One prior art approach to dealing with registration errors in a printer is disclosed in U.S. Pat. No. 6,763,199. Setup of image-to-paper registration is accomplished through use of an initial set of measurements made on a printed test pattern to determine and correct or adjust each of the independent registration errors. Registration marks employed on the test pattern are in the form of crosshairs positioned near corners of a rectangle. The measurements are taken with the crosshair registration marks constituting measurement starting points. The various measurements obtained from the registration test image are then entered into and stored by a controller in a memory. The controller can then access the measurements and supply them to a calculation circuit which performs the calculations using a set of algorithms and provides the results to a setup routine or circuit. The setup routine or circuit, under the control of the controller and in cooperation with an image forming engine of the printer, adjusts the registration altering elements of the printer to the extent necessary to perform the registration setup and stores data on the nature and extent of the adjustments.

While the approach of this patent might represent a step in the right direction for dealing with registration errors in a printer, there is still a need for an innovation that will make adjustments to compensate for image-to-paper registration errors in an alternative manner.

SUMMARY OF THE INVENTION

The present invention meets this need by providing an innovation that handles image-to-paper registration setup in a way that substantially enhances the accuracy of making measurements and thereby decreases the number of iterations needed to carrying out actuator adjustments to compensate for image-to-paper registration errors. The innovation underlying the present invention is the use of a grayscale scanner to generate a test sheet image bitmap of a sheet with a test pattern and reference targets thereon as printed by a printer and to measure in different swaths of the image bitmap various distances in units of pixels between reference targets on the sheet and/or edges of the sheet using the image bitmap as the measuring tool in units of pixels and further therewith the use of a processor to calculate positional errors and associated actuator adjustment values converted to units of millimeters, based on the distances measured in units of pixels, and to transfer such actuator adjustment values to the printer to adjust the actuators and thereby correct the image-to-paper registration setup of the printer.

Accordingly, in an aspect of the present invention, a method for carrying out a scanner-and-processor based image-to-paper printer registration setup includes: printing, using a printer that is undergoing image-to-paper registration setup, a test pattern on a sheet having a plurality of reference targets within a printable region of the sheet; scanning, using a grayscale scanner, the test pattern-bearing sheet to generate an image bitmap of the test pattern-bearing sheet such that the bitmap image is larger than the sheet itself so that the image bitmap contains the edges of the sheet within it; measuring, using the grayscale scanner, a plurality of distances in units of pixels between the reference targets and/or edges of the sheet using a plurality of swaths of the image bitmap itself as the measurement tool to produce a set of measured distances in units of pixels; calculating, using a processor, a set of positional errors in units of a device independent unit of length in the image bitmap on the sheet based on the set of measured distances in units of pixels; determining, using the processor, based on the calculated positional errors, a set of associated actuator adjustment values to correct the image-to-paper registration setup of the printer; and transferring, using the processor, the actuator adjustment values to the printer to adjust the actuators of the printer and thereby correct the image-to-paper registration setup of the printer.

In another aspect of the present invention, a system for carrying out a scanner-and-processor based image-to-paper printer registration setup includes: a printer, that is undergoing image-to-paper registration setup, configured to print a test pattern on a sheet having a plurality of reference targets within a printable region of the sheet; a grayscale scanner configured to scan the test pattern-bearing sheet, generate an image bitmap of the test pattern-bearing sheet such that the bitmap image is larger than the sheet itself so that the image bitmap contains the edges of the sheet within it, and measure a plurality of distances in units of pixels between the reference targets and/or edges of the sheet in the image bitmap using a plurality of swaths of the image bitmap itself as the measurement tool to produce a set of measured distances in units of pixels; and a processor configured to calculate positional errors in units of a device independent unit of length in the image bitmap on the sheet based on the set of measured distances in units of pixels, determine from the calculated positional errors a plurality of associated actuator adjustment values to correct the image-to-paper registration setup of the printer, and transfer the actuator adjustment values to the printer to adjust actuators of the printer and thereby correct the image-to-paper registration setup of the printer.

In a further aspect of the present invention, a test sheet image bitmap includes an image of a sheet having a test pattern thereon with reference targets of a darker color than the sheet, the sheet bounded by a plurality of interconnected edges extending about a perimeter of the sheet, and a border strip around at least a portion of the edges of the sheet being of a darker color than the sheet so as to provide a contrast with the edges allowing the edges to be identifiable in the image of the sheet. The image of the sheet also has a marking thereon identifying a printer that is readable by a scanner.

BRIEF DESCRIPTION OF THE DRAWINGS

Figure 1:
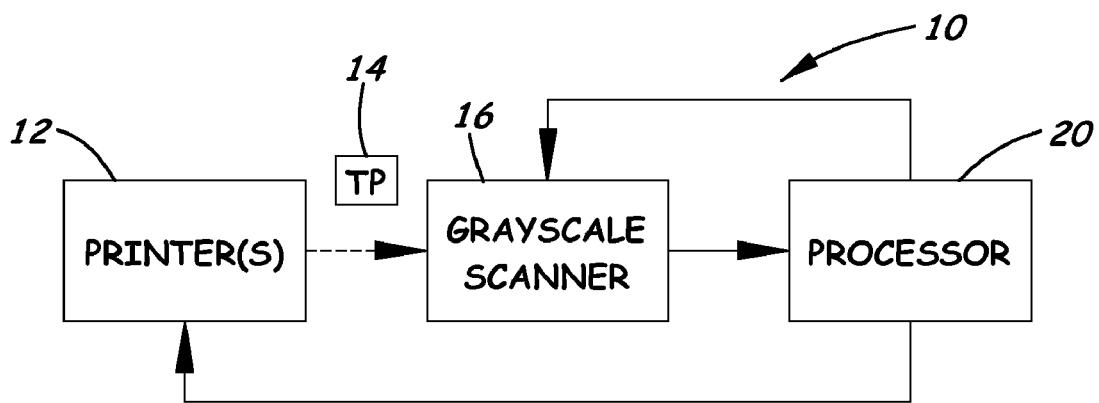

Having thus described the invention in general terms, reference will now be made to the accompanying drawings, which are not necessarily drawn to scale, and wherein:

FIG. 1 is a block diagram of a system of components of the present invention for carrying out a scanner-and-processor based image-to-paper printer registration setup method of the present invention.

Figure 2:
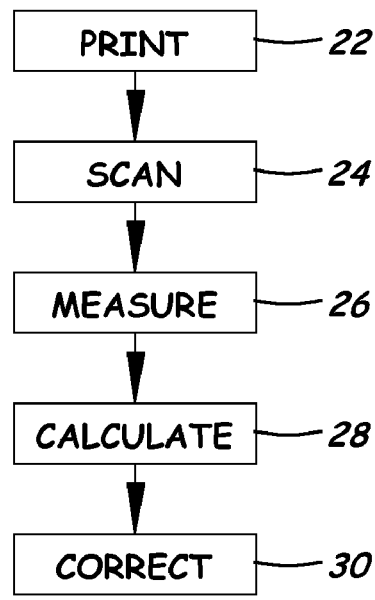

FIG. 2 is a flow diagram of the scanner-and-processor based image-to-paper printer registration step method of the present invention.

Figure 3:
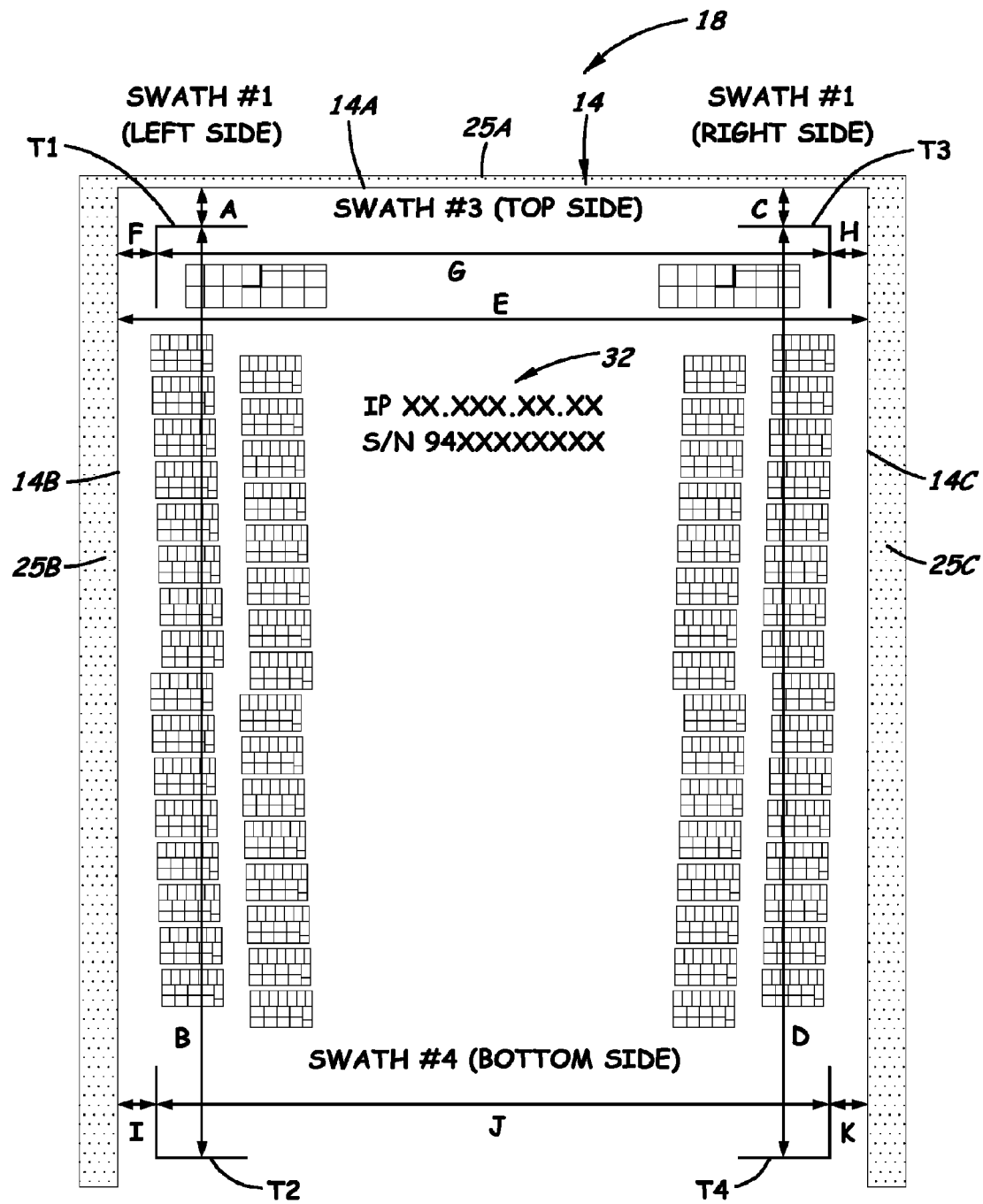

FIG. 3 is a plan view of a grayscale scanner-produced test sheet image bitmap of the printed test pattern in accordance with the present invention.

Figure 4:
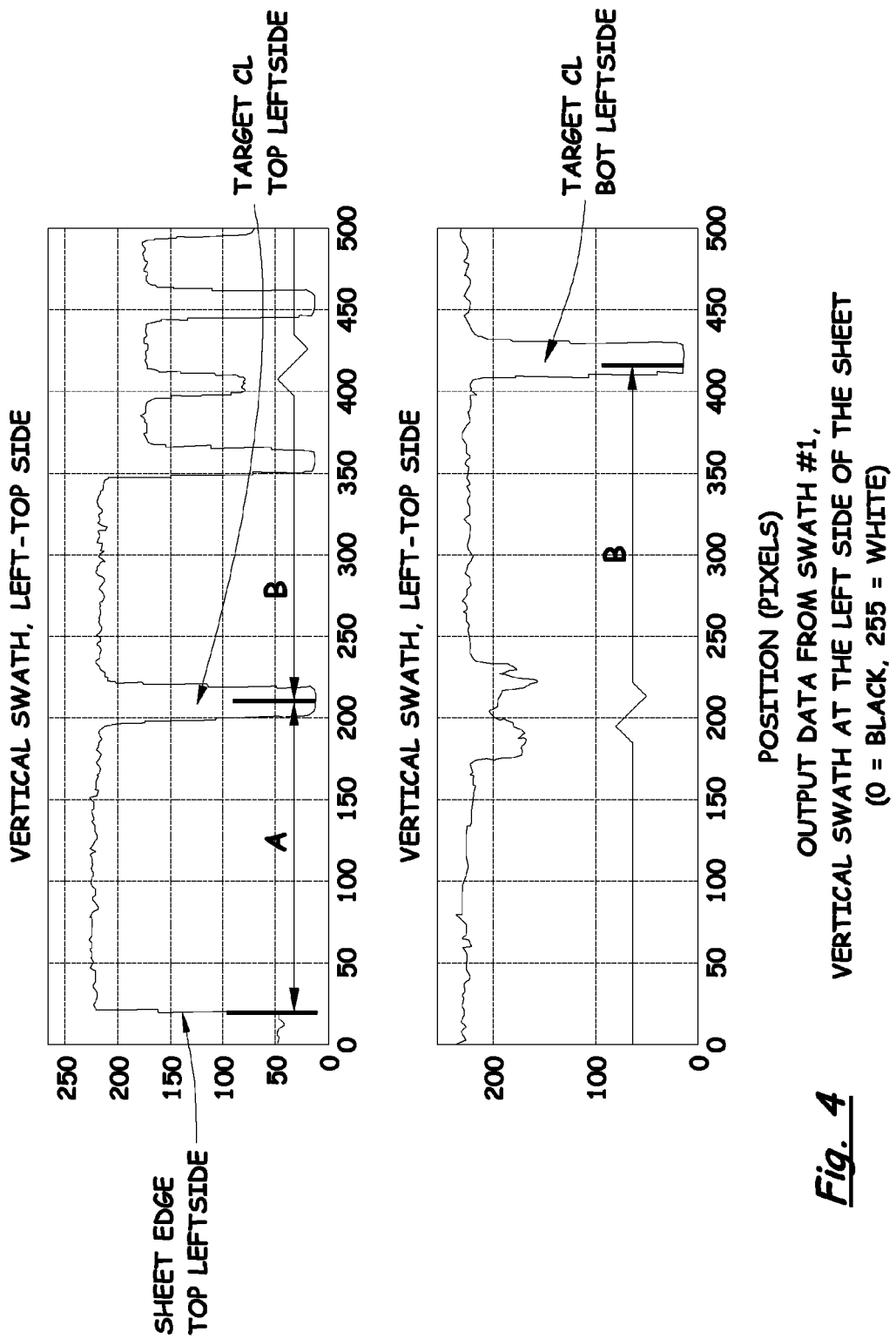

FIG. 4 is a graphical representation of output data from scanning a first swath of the image bitmap of the printed test pattern shown in FIG. 3.

Figure 5:
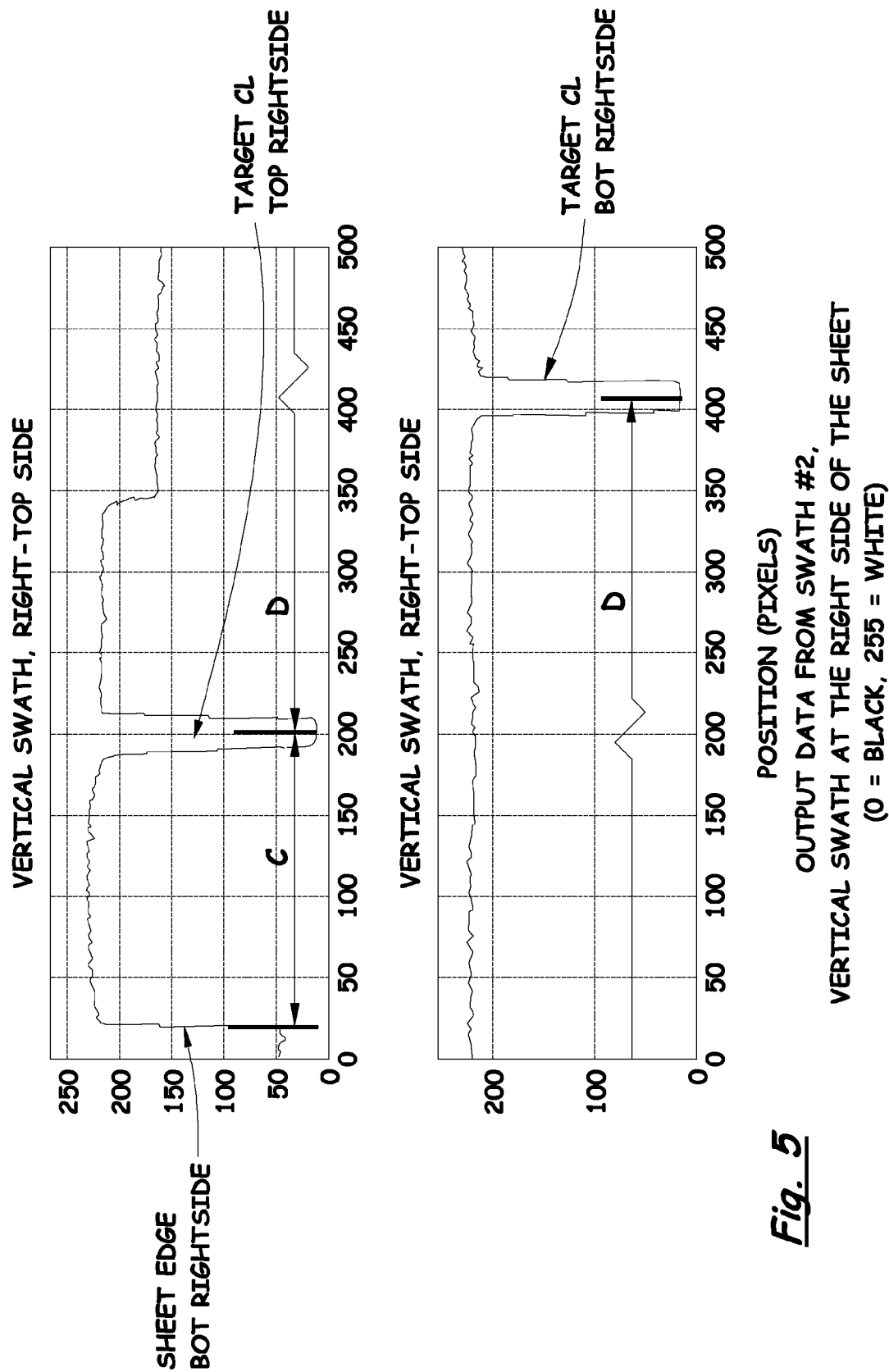

FIG. 5 is a graphical representation of output data from scanning a second swath of the image bitmap of the printed test pattern shown in FIG. 3.

Figure 6:
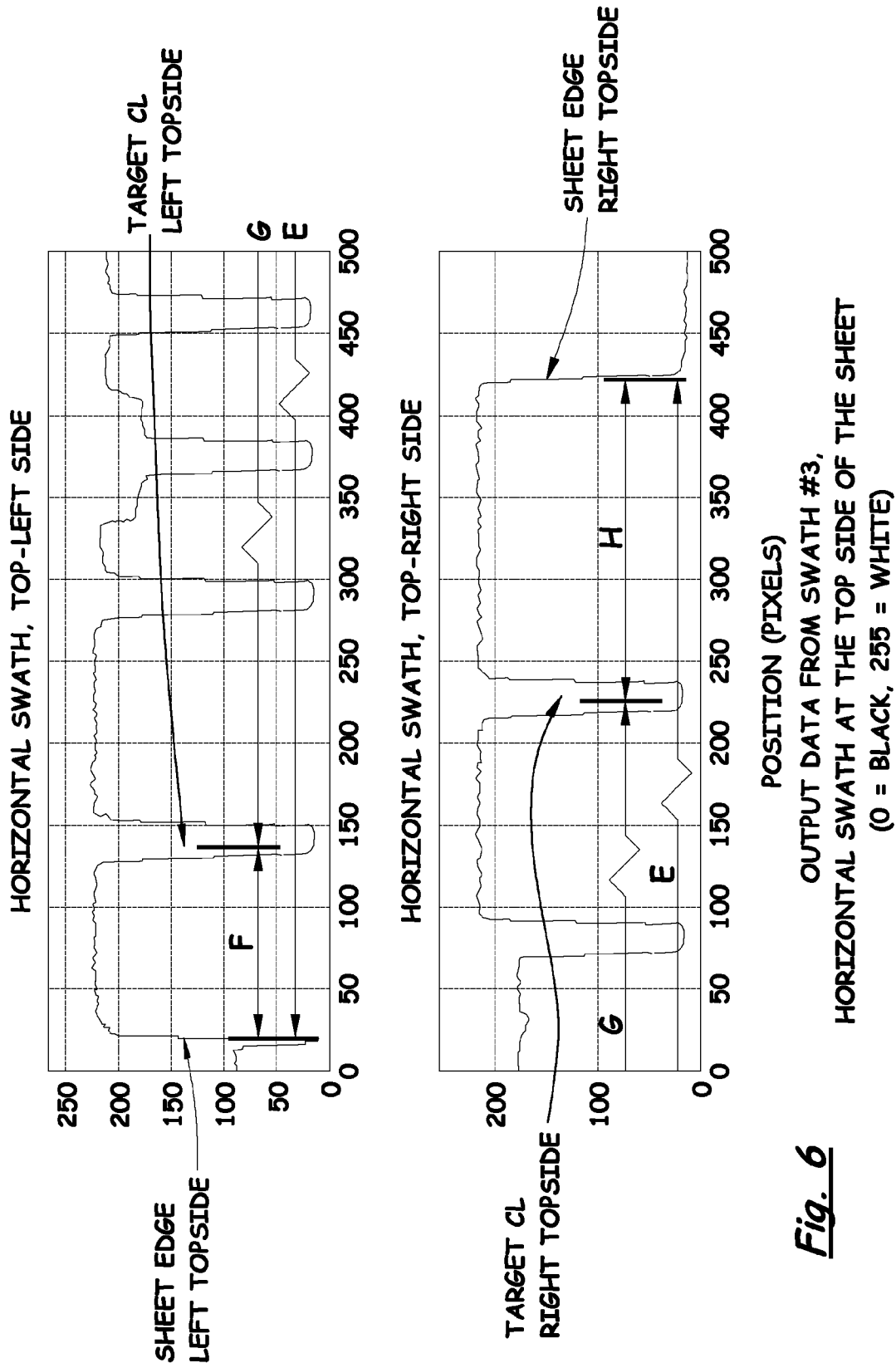

FIG. 6 is a graphical representation of output data from scanning a third swath of the image bitmap of the printed test pattern shown in FIG. 3.

Figure 7:
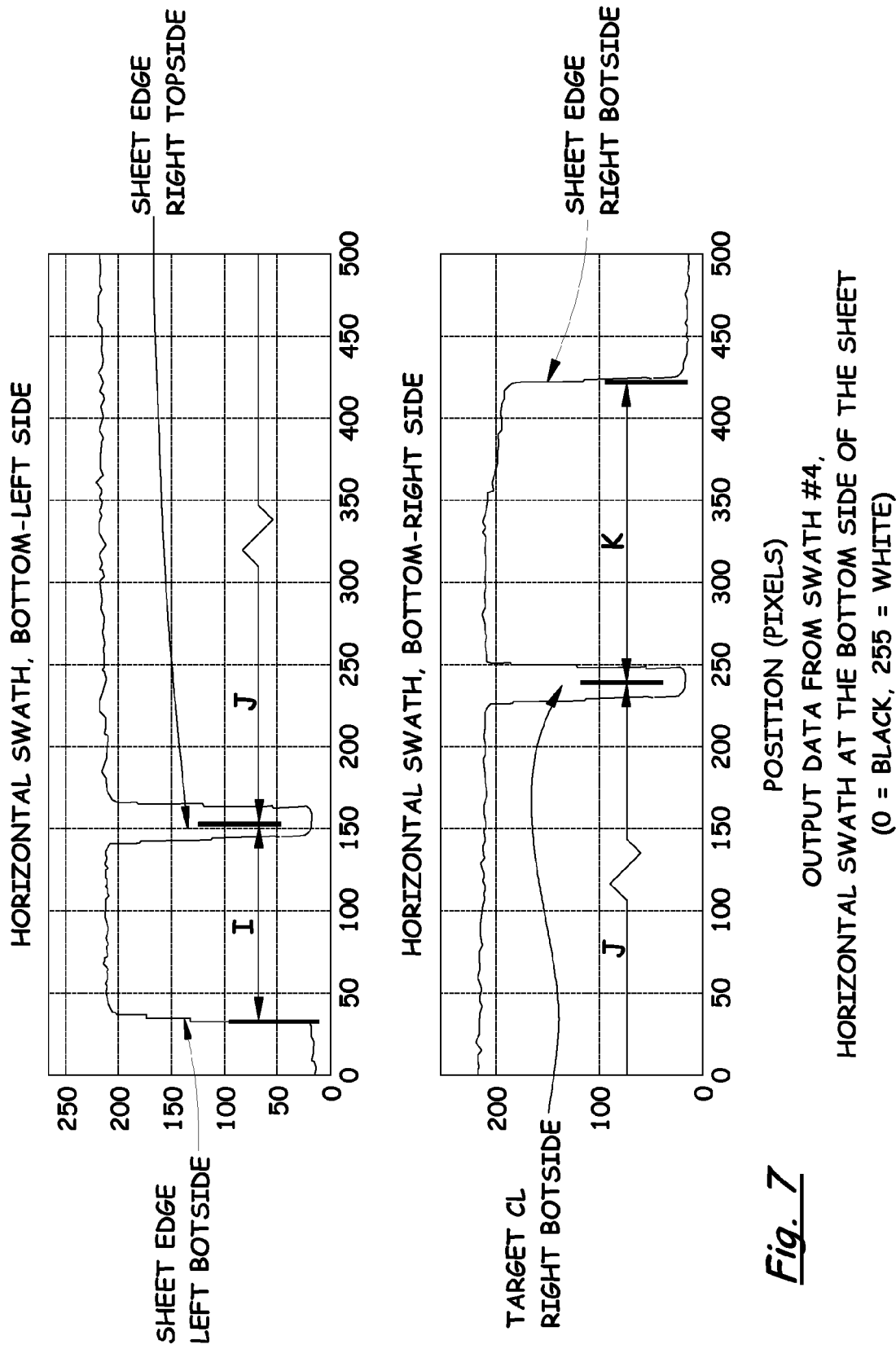

FIG. 7 is a graphical representation of output data from scanning a fourth swath of the image bitmap of the printed test pattern shown in FIG. 3.

DETAILED DESCRIPTION

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numerals refer to like elements throughout the views.

Referring now to FIGS. 1-3, there is illustrated a system of the present invention, generally designated 10 in FIG. 1, for performing a scanner-and-processor based image-to-paper printer registration setup method of the present invention in accordance with the general flow diagram of FIG. 2. The system 10 basically includes a printer 12, a test pattern (TP) printed on a sheet 14 by the printer 12, a grayscale scanner 16, an image bitmap 18, as seen in FIG. 3, of the test pattern-bearing sheet 14 generated by the scanner 16, and a processor 20 connected to the scanner 16 and printer 12. These components are employed cooperatively together to carry out the method of the present invention.

For initiating the method, as per block 22 the printer 12 is configured, used and operated to PRINT the test pattern TP on the sheet 14 including printing the reference targets T1-T4 on the sheet 14. The reference targets T1-T4, being in an exemplary form right-angle marks, are printed on the sheet 14 within a printable region of the sheet 14 by using predetermined nominal distances to the top edge 14A and left and right side edges 14B, 14C of the sheet 14. The test sheet 14 is then placed onto the grayscale scanner 16, which in an exemplary embodiment is a flatbed scanner.

As per block 24, the grayscale scanner 16 is configured, used and operated to SCAN the test pattern-bearing sheet 14 in order to create the test sheet image bitmap 18, as seen in FIG. 3, of the present invention which may be larger than the test pattern-bearing sheet 14, and must include the edge of the paper. Thus, the grayscale scanner 16 is able to scan an area wider than the sheet 14 so as to be able to distinguish the top edge 14A and left and right side edges 14B, 14C of the sheet 14 within the bitmap 18. This scanned area wider than the sheet 14 is represented by the gray strips 25A-25C surrounding the sheet 14 on the top and left and right sides in FIG. 3. By way of example, the grayscale scanner 16 is configured to scan the sheet 14 at about 400 dpi using 8 bit resolution which means 8 bits per pixel.

As per block 26, the grayscale scanner 16 is also used to scan the test pattern image bitmap 18, in conjunction with the processor 20, to MEASURE distances between reference targets T1-T4 and/or the top edge 14A and left and right side edges 14B, 14C of the sheet 14 using the image bitmap 18 as the measuring tool so as to make available measurements of the distances in readily readable units of pixels. A routine (not shown) in the scanner 16 ensures that these measurements are precise and accurate, which significantly decreases the number of iterations needed to register the printer 12.

Toward this end, as shown in FIG. 3, the image bitmap 18 is evaluated in four separate swaths. Each swath is approximately 3 mm wide. A first swath identified for use, as swath #1 in FIG. 3, in evaluation of the bitmap 18 is a vertical swath extending along the left side of the sheet 14. This first swath, or swath #1, is used to determine the top margin error at the left side of the sheet 14 as well as a measured process direction line-length from the top left reference target T1 to the bottom left reference target T2. A second swath identified for use, as swath #2 in FIG. 3, in evaluation of the bitmap 18 is a vertical swath extending along the right side of the sheet 14. This second swath, or swath #2, is used to determine the top margin error at the right side of the sheet 14 as well as a measured process direction line-length from the top right reference target T3 to the bottom right reference target T4. A third swath identified for use, as swath #3 in FIG. 3, in evaluation of the bitmap 18 is a horizontal swath extending along the top of the sheet 14. This third swath, or swath #3, is used to determine the margin errors at the left and right sides of the sheet 14 along the top thereof. A fourth swath identified for use, as swath #4 in FIG. 3, in evaluation of the bitmap 18 is a horizontal swath extending along the bottom of the sheet 14. This fourth swath, or swath #4, is used to determine margin errors at the left and right sides of the sheet 14 along the bottom thereof.

Referring to FIGS. 4-7, the measuring takes the form of producing a waveform graph corresponding to each of the swaths #1 to #4 wherein one coordinate, the abscissa, of the waveform graph is a distance measurement in units of pixels and the other coordinate, the ordinate, of the waveform graft is a particular shade of gray per pixel ranging between zero, representing pure black, to 255, representing pure white. Each waveform graph in FIGS. 4-7 represents the amount of current generated by a light sensor (not shown) in the circuitry of the grayscale scanner 16 which depends on the amount of light reflected from a given swath, the greater the amount of light reflected the greater the current. The sharp transition on the bitmap 18 from the gray background surrounding the sheet 14 to white or blank space at the edges 14A-14C of the sheet 14 and from the dark legs of the reference targets T1-T4 to white or blank space on the sheet 14 surrounding the reference targets T1-T4, which represent sharp contrasts between low and high amounts of reflected light from such features on the bitmap 18, thus produce low and high amounts of current that are readily readable from the waveform graph of FIGS. 4-7 as the various locations along the abscissa where the current spikes toward or approaches zero. The circuitry of the grayscale scanner 16 has an analog-to-digital (A-D) converter (not shown) that stores each analog reading of the waveform graph for each pixel location as a digital number between zero and 255. The measurements of the distances between the locations of these sharp transitions, as represented by the letters A-K on the bitmap 18 and waveform graphs of FIGS. 4-7, can be readily made merely by counting the numbers of pixels along the abscissa coordinate between the locations of these sharp transitions. The circuitry of the grayscale scanner 16 for performing these operations is well-known, so no additional components need to be added to the scanner 16 for it to be able to measure these distances. It should be pointed out here that the measurements are made to the center of the dark legs of the reference targets T1-T4 so it is advantageous for these legs to have significant thickness so that the location of the centerline CL can be readily determined and accurate measurements can be made (this in contrast to the crosshairs of the above-cited patent which need to be as thin as possible to make accurate measurements).

As per block 28, the processor 20 receives these measurements of various distances, as represented by the letters A-K on the bitmap 18 and waveform graphs of FIGS. 4-7. The measured distances are then used by the processor 20 to CALCULATE the positional errors and determine the associated actuator adjustment values, the "parameters", necessary to register the image to the sheet 14. These parameters determined from the bitmap 18 are shown in FIG. 2. They are given in pixel units and must be converted to millimeters. (Forty-seven pixels equal 3 mm, the width of a swath.) These distances are then compared to nominal values, to determine the errors. The following are nominal values that may be used in the calculations:

Sheet_Nom_Margin=9.525 mm (this value is equal on all four sides of the sheet, and is represented by the distances A, C, F, H, I and K, shown in FIG. 3);
Sheet_Nom_Length (letter size)=279.4 mm;
Sheet_Nom_Width (letter size)=215.9 mm;
Res (Resolution)=400 dots/inch.

Also, skew, top margin and bottom margin adjustment values are calculated based on these nominal values. Skew is adjusted by pivoting the line about the left margin of the page (this may be accomplished by several means, either electronically by modifying the bitmap, or mechanically, by means of rotating the printhead). The skew is given in millimeters adjustment over the nominal line width of 8.5 inches. A positive skew adjustment is assumed to rotate the line counter-clockwise (CCW). Skew: skew_adjust (mm)=[('C'−'A')*25.4/Res]*[Sheet_Nom_Width/(Sheet_Nom_Width−2*Sheet_Nom_Margin)].

Top Margin: The Top Margin is adjusted electronically by either advancing, or delaying the first scan-line of the image. A positive adjustment moves the line down the page, while a negative adjustment moves the lineup the page. TM_adjust (mm)=Sheet_Nom_Margin−('A'*25.4/Res).

Bottom Margin: The Bottom Margin adjustment moves the bottom of the image in the process direction. A positive adjustment moves the image down the page, while a negative adjustment moves the image up the page. The bottom margin adjusts the magnification of the image. The top margin is then compensated to remain stationary as the bottom margin is adjusted. BM_adjust (mm)=(Sheet_Nom_Length−2*Sheet_Nom_Margin)−('B'+'D')/2*25.4/Res.

The present invention also proposes the width of the sheet 14 be measured. The nominal distances from the registration targets T1-T4 to the edge 14A-14C of the sheet 14 are then adjusted based on the measured sheet width, allowing register of the setup to the nominal position and not to a given sheet having a random width (thereby allowing the achievement of the proper line-length across the page).

Left Margin: The left margin adjustment moves the left edge of the image. A positive adjustment increases the margin moving the image to the right, while a negative adjustment moves the image to the left. LM_adjust (mm)=Sheet_Nom_Margin+Sheet_width_offset−('F'+I)/2*25.4/Res.

Right Margin: The right margin adjustment moves the right edge of the image. A positive adjustment increases the margin moving the image to the left, while a negative adjustment moves the image to the right. RM_adjust (mm)=Sheet_Nom_Margin+Sheet_width_offset−('H'+'K')/2*25.4/Res.

Where the Sheet_width_offset (which is based on the averaged width of the sheet using the top and bottom swaths) equals:
if Measured_Sheet_width>(Sheet_Nom_Width+2.07)
Sheet_width_offset=1.2;
else if Measured_Sheet_width>(Sheet_Nom_Width+1.21)
Sheet_width_offset=0.8;
else if Measured_Sheet_width>(Sheet_Nom_Width+0.41)
Sheet_width_offset=0.4;
else if Measured_Sheet_width>(Sheet_Nom_Width−0.39)
Sheet_width_offset=0.0;
else if Measured_Sheet_width>(Sheet_Nom_Width−1.19)
Sheet_width_offset=−0.4;
else if Measured_Sheet_width>(Sheet_Nom_Width−1.99)
Sheet_width_offset=−0.8;
else if Measured_Sheet_width. (Sheet_Nom_Width−2.79)
Sheet_width_offset=−1.2.

As per block 30, the processor 20 is also used to download the calculated actuator adjustment values or parameters from the processor 20 (or scanner PC) to a NVRAM of the printer 12, via a serial or USB interface, to where adjustment of the setup actuators of the printer 12 is performed in a well-known manner to CORRECT any registration errors. The processor 20 may be configured to download the parameters automatically, negating any requirement to manually enter the adjustment values.

The printer 12, scanner 16 and processor 20 can be stand alone components. Alternatively, it should also be realized that the printer 12 and scanner 16 can be part of an AIO (All-In-One) device connected to a processor 20 in the form of a desktop computer, in which the test page or sheet 14 may be fed from the AIO printer into the AIO scanner, which can read the information on the test page and together with the desktop computer determine which variable to change in the printer to bring the registration parameters into specification. Also, if there are multiple printers on a network which are stand alone without a scanner, it is possible for a user to print calibration or registration sheets from all printers and take them to any scanner that is on the network and have an auto-document feeder feed them into the scanner and analyze them for the above parameters. Further, the test page or sheet 14 has included thereon scanner-readable markings 32 identifying the printer(s) 12, such as serial numbers and/or IP addresses, such as shown in test pattern of FIG. 3. The scanner 16 can use these identifiers to then send the adjustments to the parameters across the network to the appropriate printer 12. Included on the sheet 14 will also be instructions on how to scan the sheet 14 and also directions to allow the user to manually make these adjustments through an operator panel, if needed. Finally, although the origination of this innovation was directed at the 'laser' printer family, it may be more applicable to the inkjet printer family that currently makes up a large portion of the AIO family. These printers are also intended for home use where the user may not have the benefit of a highly skilled staff.

To recap, a scanner-and-processor based image-to-paper printer registration setup method is carried out in accordance with the present invention by the system 10 of the present invention which includes the printer 12 undergoing registration, the grayscale scanner 16 used to generate and make measurements on the test sheet image bitmap 18 of the present invention that contains the test pattern TP printed on the sheet 14 by the printer 12 as well as defines edges 14A-14C of the sheet 14 made by scanning areas beyond the perimeter of the sheet 14, and the processor 20 used to read the measurements and calculate error values and associated actuator adjustment values from the measurements made by the grayscale scanner 16. The grayscale scanner 16 further is used to scan selected swaths of the image bitmap 18 and makes the measurements of various distances in pixel units between reference targets T1-T4 in the test pattern TP and/or edges 14A-14C of the sheet 14 using the image bitmap 18 as the measuring tool in units of pixels. The processor 20 processes the measurements by converting the units from pixels to millimeters, calculating the margin errors and their associated actuator adjustment values, and downloading the actuator adjustment values to the printer 12 undergoing the registration setup where adjustment of the setup actuators is performed.

Some advantages of the present invention are that: (1) the ease of use by users when making printer adjustments is greatly improved; (2) the consistency of adjustments that a user makes is improved by allowing the scanner to make the adjustments for them; (3) the ease of use on the assembly line when making printer adjustments is greatly improved; (4) the consistency of adjustments that an assembly operator makes is improved by allowing the scanner to make the adjustments for them; and (5) the paper width and length are measured thus removing the sensitivity to paper size variability.

The foregoing description of several embodiments of the invention has been presented for purposes of illustration. It is not intended to be exhaustive or to limit the invention to the precise forms disclosed, and obviously many modifications and variations are possible in light of the above teaching. It is intended that the scope of the invention be defined by the claims appended hereto.

What is claimed is:

1. A scanner-and-processor based method for carrying out image-to-paper registration setup in a printer, comprising:
using a printer undergoing image-to-sheet registration setup, printing a test pattern on a sheet having a plurality of reference targets within a printable region of the sheet;
using a grayscale scanner, scanning the test pattern-bearing sheet to generate an image bitmap of the test pattern-bearing sheet such that the bitmap image exceeds or includes the edges of the sheet so that the image bitmap contains the edges of the sheet within it;
using the grayscale scanner, measuring a plurality of distances in units of pixels between the reference targets and/or edges of the sheet using a plurality of swaths of the image bitmap itself as the measurement tool to produce a set of measured distances in units of pixels, the measuring taking the form of producing a waveform of current corresponding to an amount of light reflected by features in each of the swaths;
using a processor, calculating positional errors of the image bitmap on the sheet based on the set of measured distances after conversion from pixels to a device independent unit of length;
using the processor and based on the calculated positional errors, determining a plurality of actuator adjustment values to use to correct the image-to-paper registration setup of the printer; and
using the processor, transferring the actuator adjustment values to the printer to adjust actuators of the printer and thereby correct the image-to-paper registration setup of the printer.

2. The method of claim 1 wherein said scanning using the grayscale scanner takes the form of scanning using flatbed grayscale scanner.

3. The method of claim 1, wherein one coordinate of the waveform is a distance measurement in counts of pixels between reference targets and/or edges of the sheet and the other coordinate of the waveform is a particular shade of gray per pixel ranging between zero, representing pure black, to 255, representing pure white.

4. The method of claim 3 wherein said calculating takes the form of reading digital signals representing counts of pixels using said processor and converting said counts of pixels to measurements in units of a device independent unit of length for calculating the positional errors of the image bitmap on the sheet.

5. The method of claim 1 wherein said measuring includes identifying a first vertical swath to use to determine a top margin error at a left side of said sheet.

6. The method of claim 1 wherein said measuring includes identifying a first vertical swath at a left side of said sheet to determine a measured process direction line-length from a top reference target to a bottom reference target.

7. The method of claim 1 wherein said measuring includes identifying a second vertical swath to use to determine a top margin error at a right side of said sheet.

8. The method of claim 1 wherein said measuring includes identifying a second vertical swath at a right side of said sheet to determine a measured process direction line-length from a top reference target to a bottom reference target.

9. The method of claim 1 wherein said measuring includes identifying a third horizontal swath to use to determine margin errors at left and right sides of said sheet along a top of said swath.

10. The method of claim 1 wherein said measuring includes identifying a fourth horizontal swath to use to determine margin errors at left and right sides of said sheet along a bottom of said sheet.

11. The method of claim 1 wherein said calculating includes calculating at least one of top margin, bottom margin, left margin, right margin and skew errors.

12. A scanner-and-processor based system for carrying out image-to-paper registration setup in a printer, comprising:
a printer, that is undergoing image-to-sheet registration setup, configured to print a test pattern on a sheet having a plurality of reference targets in the test pattern within a printable region of the sheet;
a grayscale scanner configured to scan the test pattern-bearing sheet, generate an image bitmap of the test pattern-bearing sheet such that the bitmap image is larger than the sheet itself so that the image bitmap contains the edges of the sheet within it, and measure a plurality of distances in units of pixels between the reference targets and/or edges of the sheet in the image bitmap using a plurality of swaths of the image bitmap itself as the measurement tool to produce a set of measured distances in units of pixels; and a processor configured to convert the set of measured distances from units of pixels to units of a device independent unit of length, calculate positional errors of the image bitmap on the sheet based on the set of measured distances, determine from the calculated positional errors a plurality of associated actuator adjustment values to use to correct registration setup of the image-to-paper printer registration setup, and transfer the actuator adjustment values to the printer to adjust the actuators and thereby correct the image-to-paper registration setup thereof.

13. The system of claim 12 wherein said grayscale scanner is a flatbed type of scanner.

14. The system of claim 12 wherein a first swath of said image bitmap is a vertical swath thereof on a left side of said sheet used to determine a top margin error at the left side of said sheet.

15. The system of claim 12 wherein a second swath of said image bitmap is a vertical swath thereof on a right side of said sheet used to determine a top margin error at the right side of said sheet.

16. The system of claim 12 wherein a third swath of said image bitmap is a horizontal swath thereof along a top of said sheet used to determine margin errors at left and right sides of said sheet along the top of said sheet.

17. The system of claim 12 wherein a fourth swath of said image bitmap is a horizontal swath thereof along a bottom of said sheet used to determine margin errors at left and right sides of said sheet along the bottom of said sheet.

18. A test page image bitmap in a scanner, comprising:
an image of a sheet having a test pattern thereon with reference targets of a darker color than said sheet, said sheet bounded by a plurality of interconnected edges extending about a perimeter of said sheet; and
a border strip around at least a portion of said edges of said sheet being of a darker color than said sheet so as to provide a contrast with said edges allowing said edges to be identifiable in said image of said sheet;
wherein the image of the sheet has a marking thereon identifying a printer that is readable by the scanner.

19. A scanner-and-processor based method for carrying out image-to-paper registration setup in a printer, comprising:
using a printer undergoing image-to-sheet registration setup, printing a test pattern on a sheet having a plurality of reference targets within a printable region of the sheet;
using a grayscale scanner, scanning the test pattern-bearing sheet to generate an image bitmap of the test pattern-bearing sheet such that the bitmap image exceeds or includes the edges of the sheet so that the image bitmap contains the edges of the sheet within it;
using the grayscale scanner, measuring a plurality of distances in units of pixels between the reference targets and/or edges of the sheet using a plurality of swaths of the image bitmap itself as the measurement tool to produce a set of measured distances in units of pixels;
using a processor, calculating positional errors of the image bitmap on the sheet based on the set of measured distances after conversion from pixels to a device independent unit of length;
using the processor and based on the calculated positional errors, determining a plurality of actuator adjustment values to use to correct the image-to-paper registration setup of the printer; and
using the processor, transferring the actuator adjustment values to the printer to adjust actuators of the printer and thereby correct the image-to-paper registration setup of the printer,
wherein said calculating includes using at least one of predetermined nominal values of margin width, sheet length, sheet width and grayscale resolution which is compared to the corresponding at least one of said measured distances to determine the corresponding error.

20. The method of claim 1, further comprising using analog-to-digital conversion, storing each current reading of the waveform as a digital number between zero and 225 for each of the coordinates.

* * * * *